United States Patent [19]

Konzak

[11] Patent Number: 4,573,427

[45] Date of Patent: Mar. 4, 1986

[54] BIRD SCARING DEVICE

[76] Inventor: Peter Konzak, Box 547, Devils Lake, N. Dak. 58301

[21] Appl. No.: 499,696

[22] Filed: May 31, 1983

Related U.S. Application Data

[63] Continuation-in-part of Ser. No. 388,040, Jun. 14, 1982, abandoned.

[51] Int. Cl.[4] .............................................. G08B 7/00
[52] U.S. Cl. ..................................... 116/22 A; 40/412; 74/127; 273/387; 446/180; 446/199; 446/310
[58] Field of Search .................................. 40/411–417, 40/477, 479, 465, 561, 902, 421, 422, 439; 46/44, 115, 126, 145, 146, 216; 73/189; 74/108, 126, 127; 116/4, 22 A, 23, 67 R, 137 R, 274, 282; 124/1, 11, 13, 30, 55, 77; 188/282, 297, 299–301; 273/1 R, 349, 378, 384, 385; 417/565; 446/8, 9, 308–314; 250/203 S, 214 AL; 52/101

[56] References Cited

U.S. PATENT DOCUMENTS

| | | | |
|---|---|---|---|
| 764,759 | 7/1904 | Owen | 73/189 |
| 966,950 | 8/1910 | Puha | 116/22 A |
| 1,070,799 | 8/1913 | Grisell | 16/66 |
| 1,883,028 | 8/1931 | Smith | 141/162 |
| 1,883,029 | 9/1931 | Smith | 162/151 |
| 1,908,070 | 1/1931 | Smith | 42/55 |
| 1,934,375 | 11/1933 | Reynolds et al. | 73/189 |
| 2,049,360 | 7/1936 | Erickson | 40/413 |
| 2,094,854 | 7/1933 | Smith | 42/55 |
| 2,967,981 | 1/1961 | Wise | 250/214 AL |
| 3,113,304 | 12/1963 | Lindley | 116/22 A |
| 3,244,888 | 4/1966 | Armstrong et al. | 250/214 AL |
| 3,572,309 | 7/1967 | DeFreitas | 124/11 |
| 3,633,560 | 11/1972 | DeFreitas | 124/11 |
| 4,074,653 | 2/1978 | Pember | 116/22 A |
| 4,325,014 | 4/1982 | Jeck | 73/189 |

FOREIGN PATENT DOCUMENTS

| | | | |
|---|---|---|---|
| 484592 | 10/1929 | Fed. Rep. of Germany | 46/145 |
| 814536 | 9/1951 | Fed. Rep. of Germany | 116/22 A |
| 1278171 | 9/1968 | Fed. Rep. of Germany | 116/22 A |
| 2257570 | 6/1974 | Fed. Rep. of Germany | 116/22 A |
| 346641 | 11/1978 | Fed. Rep. of Germany | 116/22 A |
| 2900284 | 7/1980 | Fed. Rep. of Germany | 116/22 A |

Primary Examiner—Charles Frankfort
Assistant Examiner—W. Morris Worth
Attorney, Agent, or Firm—Cushman, Darby & Cushman

[57] ABSTRACT

A device for scaring birds thereby aiding in the prevention of crop destruction due to the birds feeding thereon comprises in combination an actuator, such as an air gun which ejects at increased velocity a gaseous stream in a predetermined path, a frame including a target disposed in an impinging relationship to the gaseous stream path so as to be moved between rest and operative positions responsive to the gaseous stream, and a visual scaring member operatively connected to the target for scaring birds, the visual member being reciprocally operable between inactive and active positions in response to the target being moved between the rest and operable position, respectively. According to another embodiment of the present invention, controls are provided for disabling the device during night hours and/or during periods of increased wind velocities which could potentially damage the device.

17 Claims, 8 Drawing Figures

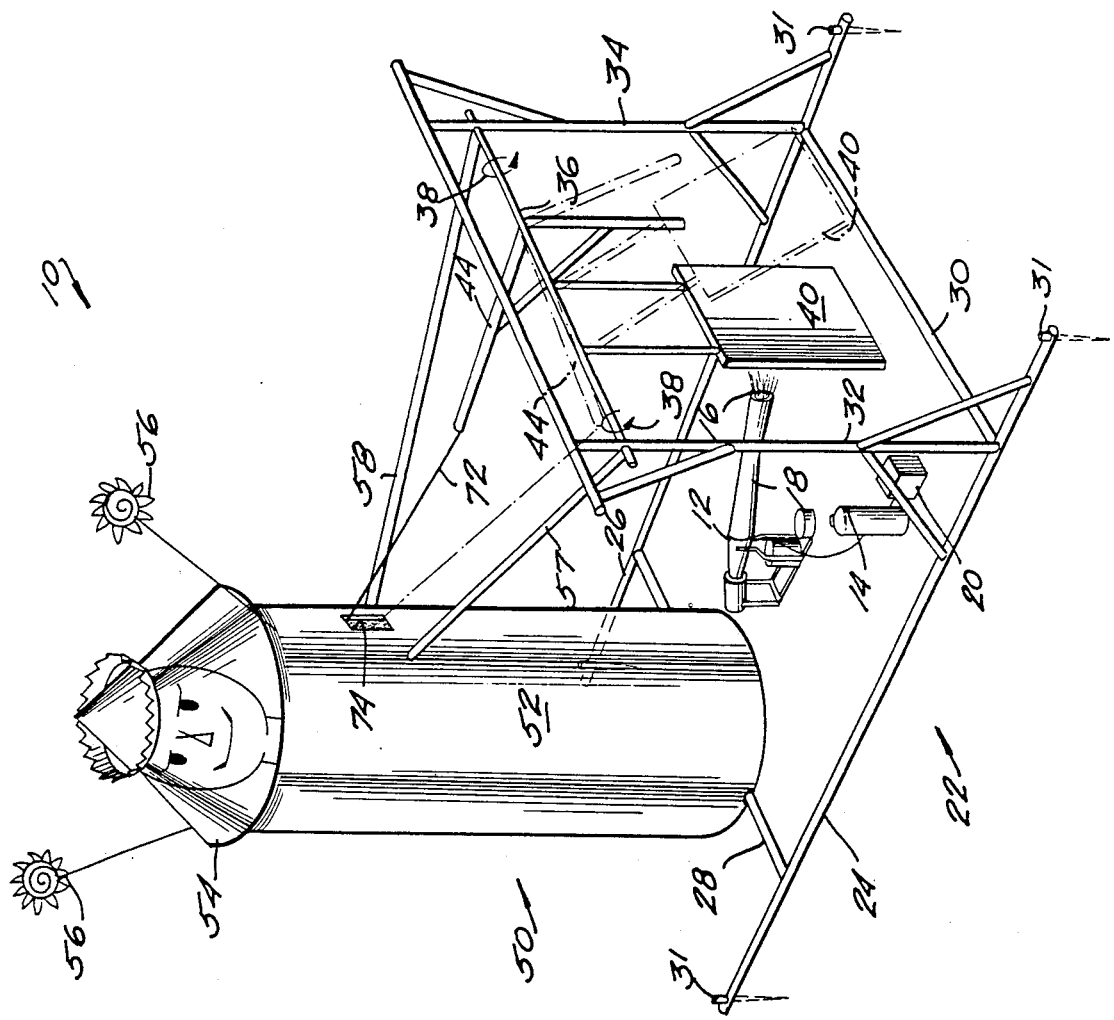

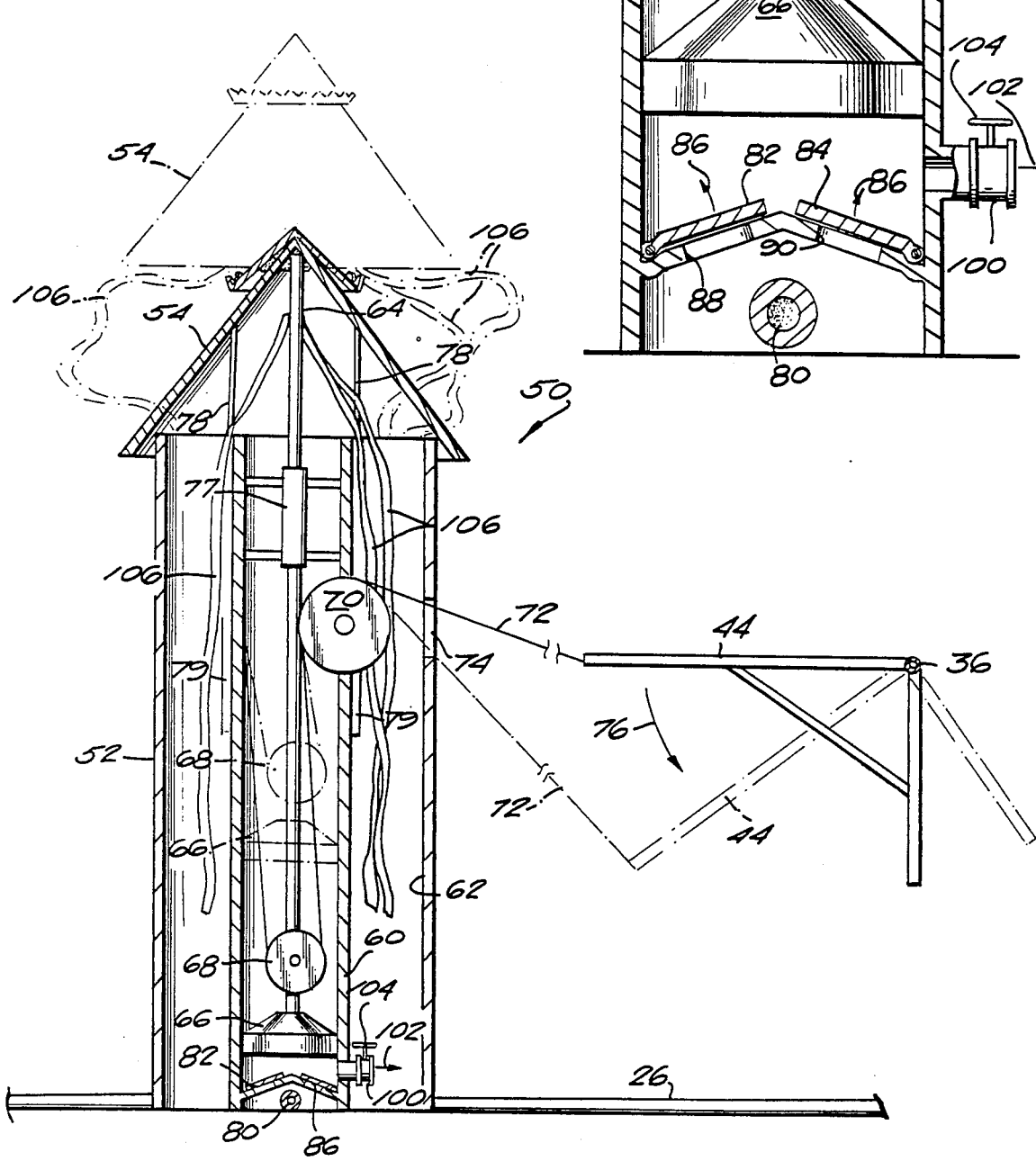

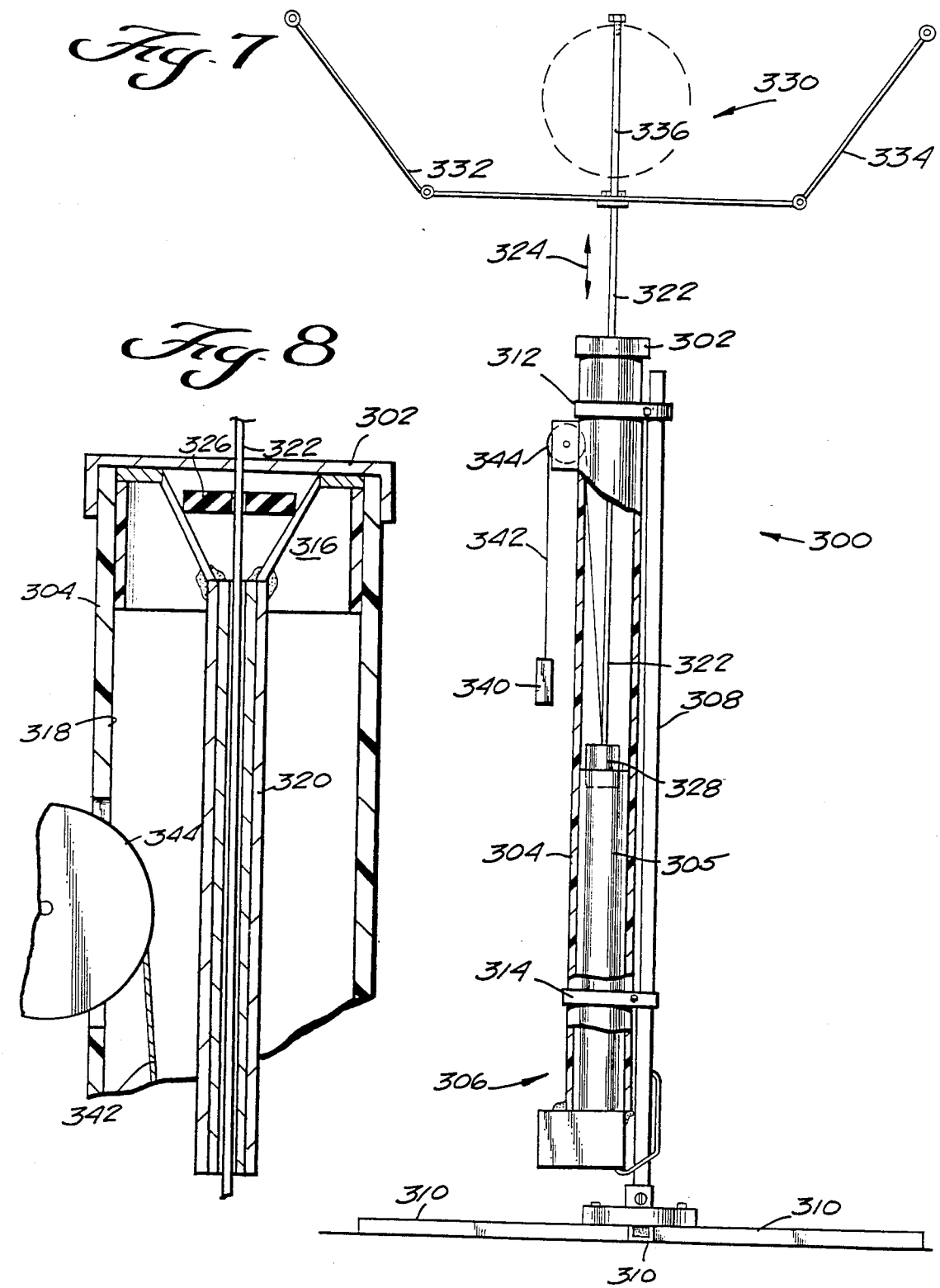

BIRD SCARING DEVICE

CROSS REFERENCE TO RELATED APPLICATIONS

This application is a continuation-in-part of my copending U.S. application Ser. No. 388,040 filed June 14, 1982 and entitled "BIRD SCARING DEVICE", now abandoned.

BACKGROUND AND SUMMARY OF THE INVENTION

The present invention generally relates to a novel device which can be successfully utilized by farmers to prevent the destruction of their crops due to birds feeding thereon. More particularly, the present invention relates to a device which scares birds and preferably causes their flight from a crop field so that their feeding habits are interrupted thereby preventing crop destruction.

The destruction of cash crops by birds feeding upon them is, of course, a well-known problem to farmers or other food producers. One of the earliest devices which man proposed for preventing the destruction of his crops from birds feeding thereon was the scarecrow. A scarecrow is, of course, a crude figure of a man which is placed in a field to scare or frighten birds from growing crops. However, the scarecrow suffers from an inherent disadvantage in that it is inanimate in nature and therefore, often times fails to perform its intended function.

It has also been proposed to utilize a loud audible noise so as to frighten birds from growing crops. Such an audible noise normally eminates from an air gun of the type which utilizes a combustible gas as a fuel source. The air gun ignites the combustible gas at predetermined time intervals thereby producing a loud noise. The loud noise associated with such air guns was initially successful in preventing birds from feeding upon cash crops. However, due to the air gun's widespread use, more and more birds have become accustomed to the periodic firing of the gun and therefore, the loud noise no longer startles a vast majority of birds. A typical air gun of the type conventionally in widespread use today is exemplified by the ones distributed by the Reed-Joseph International Company, Greenville, Miss. 38701, under the tradename "M-4 SCARE-AWAY".

Further examples of air guns utilized for scaring birds are disclosed in U.S. Pat. Nos. 3,572,309 and 3,633,560.

As mentioned above, the conventional air gun which utilizes noise to scare birds from feeding upon cash crops, while initially effective, has grown decreasingly effective through the years. Accordingly, the problem of crop destruction has remained and those who produce food have constantly endeavored to develop improved means for scaring birds in order to prevent wholesale destruction of cash crops.

The present invention is directed to the problem of crop destruction inflicted by the feeding habits of birds. The present invention presents a novel and distinct advance in the art of scaring birds from growing crops in that not only is an audible signal utilized, but an animate, visual signal is also utilized in combination therewith.

The present invention preferably utilizes an air gun actuator which is, in and of itself, well known in the art. The preferred air gun actuator utilized according to the present invention is of the type which ejects a stream of gases at increased velocity from a barrel and which also emits a loud noise so as to startle birds. The present invention utilizes the conventional air gun in combination with an animate, visual signal which is activated responsively to the stream of gases emitted by the air gun. Thus, not only is an audible loud noise emitted according to the present invention, but an animate, visual signal is provided to enhance the effectiveness of scaring birds feeding upon cash crops.

Other objects and advantages of the present invention will become more clear to those in the art after careful consideration is given to the detailed description of the preferred exemplary embodiment which follows.

BRIEF DESCRIPTION OF THE DRAWINGS

Reference will hereinafter be made to the accompanying drawings wherein like reference numerals throughout the various figures denote like structural elements and wherein:

FIG. 1 is a perspective view of a preferred exemplary embodiment of the bird scaring device according to the present invention;

FIG. 2 is a cross-sectional elevational view of the animate, visual portion of the embodiment depicted in FIG. 1;

FIG. 3 is a detail cross-sectional view of the piston arrangement utilized according to the present invention;

FIG. 7 is an elevational view, partly in section, of another embodiment of the bird scaring device in accordance with the present invention; and FIG. 8 is a detailed cross-sectional view of the upper portion of the FIG. 7 embodiment.

DETAILED DESCRIPTION OF THE PREFERRED EXEMPLARY EMBODIMENTS

Figure 4:
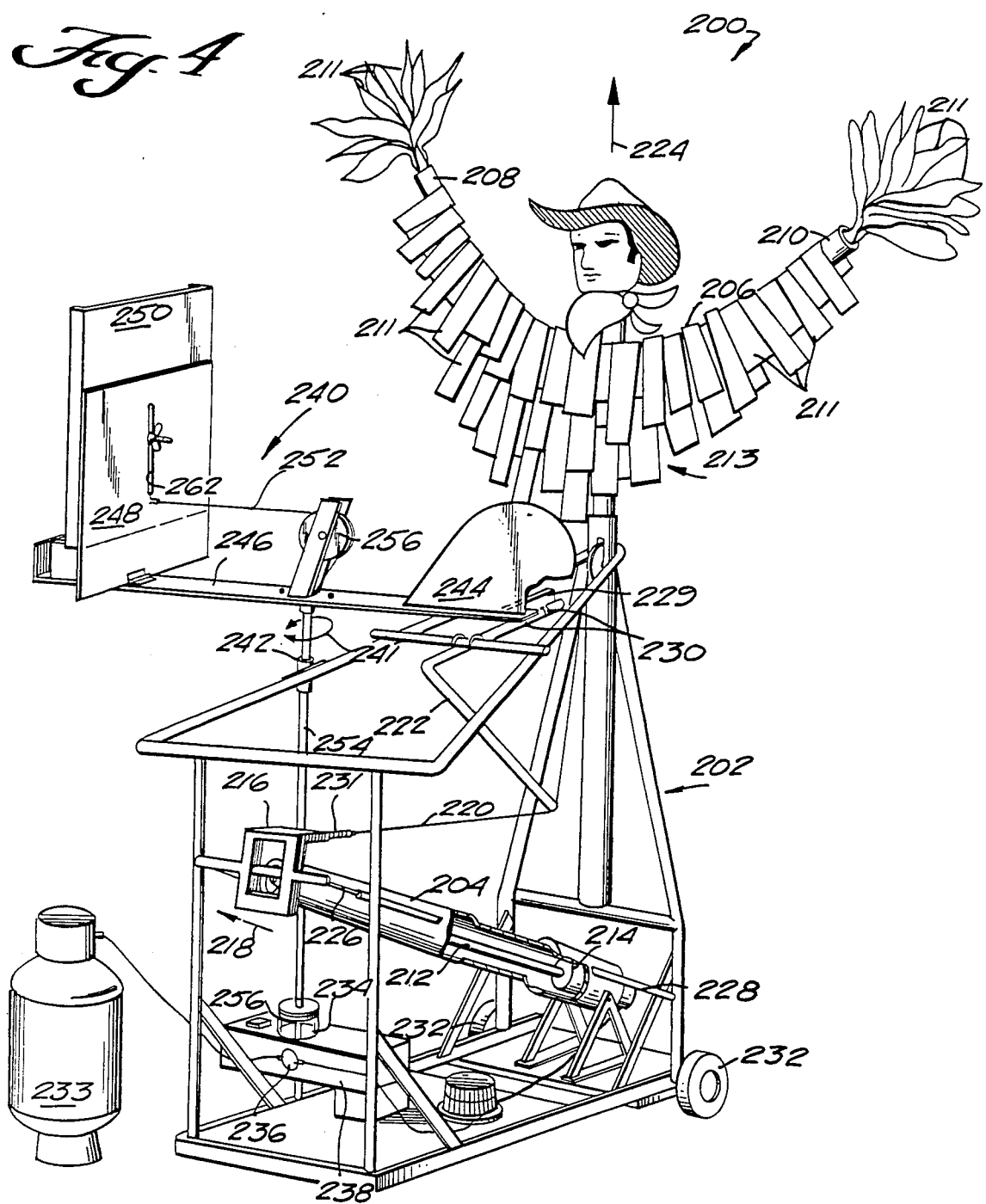
FIG. 4 is a perspective view, partially in section, of another exemplary embodiment according to the present invention.

Generally, the component parts of the bird scaring device 10 according to a preferred embodiment of the present invention can be seen in more detail by referring to FIG. 1. The device 10 generally comprises an air gun 12 of the type utilizing a combustible fuel source 14 which supplies combustible fuel to gun 12. Upon ignition of the combustible fuel, gun 12 will emit a stream of gases 16 from barrel 18 at increased velocities. Air gun 12 can be provided with a timer 20 to provide periodic ignition of the combustible gas so as to cause periodic loud audible sounds from the air gun 12 in addition to periodic emission of gas stream 16.

Preferably, air gun 12 is centrally disposed relative to a frame 22. Frame 22 generally includes parallel horizontal base members 24, 26 separated by cross support members 28, 30. Members 24, 26, 28 and 30 are adapted to being secured against the ground via stakes 31 thereby supporting the other components of the device 10 as will be more fully described hereinafter. Vertical supports 32, 34 are rigidly attached to horizontal members 24, 26. Between vertical supports 32, 34, there is journalled a cross support member 36 so that journalled movement (arrows 38) can be effected.

Dependently supported by cross support member 36 is a target plate 40 which has a surface disposed in the path of gas stream 16 emitted from air gun 12. Thus, gas stream 16 will impinge upon a surface of target plate 40 and, due to the increased velocity of gas stream 16, target plate 40 will swing outwardly relative to air gun 12 by virtue of the journalled mounting of cross support member 36 (the extent of responsive movement of target plate 40 is noted generally by phantom line in FIG. 1). Lever member 44 is rigidly attached to cross support member 36 and, therefore, responsively moves with target plate 40 when gas stream 16 impinges thereon.

The animate, visual scaring portion 50 generally comprises an enclosure 52 which houses the operable mechanisms thereof and a cap 54 which can be decorated with a suitable facsimile of a human face, for example. Swing arms 56 constructed of resilient material, e.g. a spring or the like, can optionally be attached to cap 54 to provide an auxiliary visual effect. Support members 57, 58 effect substantial rigid connection between enclosure 52 and vertical supports 32, 34 so as to stabilize it during periods of gusting winds or the like.

Referring more specifically to FIG. 2 wherein the operable components of the visual portion 50 are shown, it is seen that enclosure 52 houses a cylinder 60 and defines a space 62 between the walls of enclosure 52 and cylinder 60. Cap 54 is fixedly supported on rod 64 which is in turn axially disposed in cylinder 60. Cap 54 is arranged so that it rests upon housing 52 and covers space 62 and, thus, cylinder 60 when it is in the inactive position. On the end of rod 64 opposite cap 54, there is provided a plunger 66 which preferably is constructed of a pliable material such as rubber, or the like, and is sized so as to closely contact the interior walls of cylinder 60.

Preferably, a pulley 68 is journalled to rod 64 in the vicinity of plunger 66 and a second pulley 70 is journalled to the walls of cylinder 60 and is spaced a predetermined offset axial distance above pulley 68. A length of cable 72 is attached at one end to lever arm 44 and at the other end to a predetermined portion of cylinder 60, preferably in the area substantially opposite pully 70. Cable 72 is thus threaded around pulleys 68, 70 intermediate the two attached ends to provide a mechanical lifting system for rod 64. Of course, an opening 74 is provided in enclosure 52 so as to enable cable 72 to be threaded around pulleys 68, 70.

As previously mentioned, the increased velocity of gas stream 16 impinging upon target plate 40 will effect responsive movement of lever arm 44 to the position generally shown in phantom line in FIGS. 1 and 2 due to the journalled attachment of bar 36 to upright supports 32, 34. Referring specifically to FIG. 2, it is seen that when lever arm 44 moves (arrow 76) to the position depicted in phantom line, cable 72 will responsively cause pulley 68, and therefore, rod 64 to raise in cylinder 60. Such a raised position will be hereinafter referred to as the active position of the visual portion 50 and is generally depicted in phantom line throughout the various accompanying drawing figures.

When target plate 40 moves to its active position and, therefore, responsively causes rod 64 to be raised, plunger 66 is similarly and responsively raised in cylinder 60.

In order that rod 64 will be axially supported as it moves between the inactive and active positions as previously described, sleeve support 77 rigidly secured to cylinder 60 is provided so that rod 64 is slidably and reciprocably received therein. Additionally, supports 78 slidably and reciprocably received in conduits 79 may be provided to ensure an extra measure of stability to rod 64 in the active position. Supports 77 and 78 or the like may be required to stabilize cap 54 especially if the bird scaring device is to be utilized in an environment having gusting winds.

In a particularly preferred embodiment according to the present invention, means are provided which enable the visual portion 50 of the present invention to retain its active position for a predetermined time interval and to thereafter slowly return to its inactive position. A detailed cross-sectional view of such suitable means for retaining the visual portion 50 in the active position is shown in FIG. 3.

Plunger 66, constructed preferably of rubber or other pliable material, contacts the interior surfaces of cylinder 60 thereby providing an occlusive seal against the walls thereof. When plunger 66 is forceably raised in cylinder 60 in response to movement of target 40, the occlusive sealing effect causes ambient air to be drawn in through inlet conduit 80. Thus, one-way valve members 82, 84 are moved (arrow 86) to an open position thereby permitting the ambient air introduced through inlet conduit 80 to enter the interior cavity of cylinder 60 via ports 88, 90 associated with valve members 82, 84, respectively.

When plunger 66 has reached its maximum active position, the weight of cap 54 and rod 64 together establish a downward force upon the air which was initially drawn into the cavity of cylinder 60 as previously described. Thus, valve members 82, 84 are caused to return to their original closed position (noted in solid line in FIG. 3) thereby covering ports 88, 90, respectively. In such a manner, the egress of the air drawn into the cavity of cylinder 60 when plunger 66 moves to its operative position is prevented and this air becomes somewhat trapped therein to provide a cushion so as to maintain cap 54 in its active position.

A predetermined time interval to determine the rate at which cap 54 will return to the inactive position can be established by bleed valve 100. Bleed valve 100 permits one-way egress (arrow 102) of the ambient air which was initially drawn into the cavity of cylinder 60. The flow rate of ambient air through valve 100 can be controlled via an adjustable valve stem 104. Thus, depending upon the adjustment of valve 100 and the flow rate of air which it permits to escape the cavity of cylinder 60, cap 54 will be maintained in its active position for a predetermined time interval until the combined weight of the cap 54 and rod 64 forceably causes air to gradually escape through exit valve 100 thereby depleting the "cushion" of air in cylinder 60. Since valve stem 104 can be utilized to adjust the flow rate of air escaping from the cavity of cylinder 60, cap 54 can be caused to slowly return to its original inactive position to await activation once again due to gaseous stream 16 impinging upon target plate 40.

Auxiliary visual members can be provided according to the present invention which accent the visual scaring potential of the device according to the present invention. For example, strips of flexible streamers 106 can be fixedly attached to rod 64 so that when cap 54 is raised to its active position as described in detail above, the streamers 106 are caused to randomly move to enhance the scaring effect. When cap 54 returns to its inactive position, streamers 106 will be housed within the space 62 defined between enclosure 52 and cylinder 60.

Figure 6:
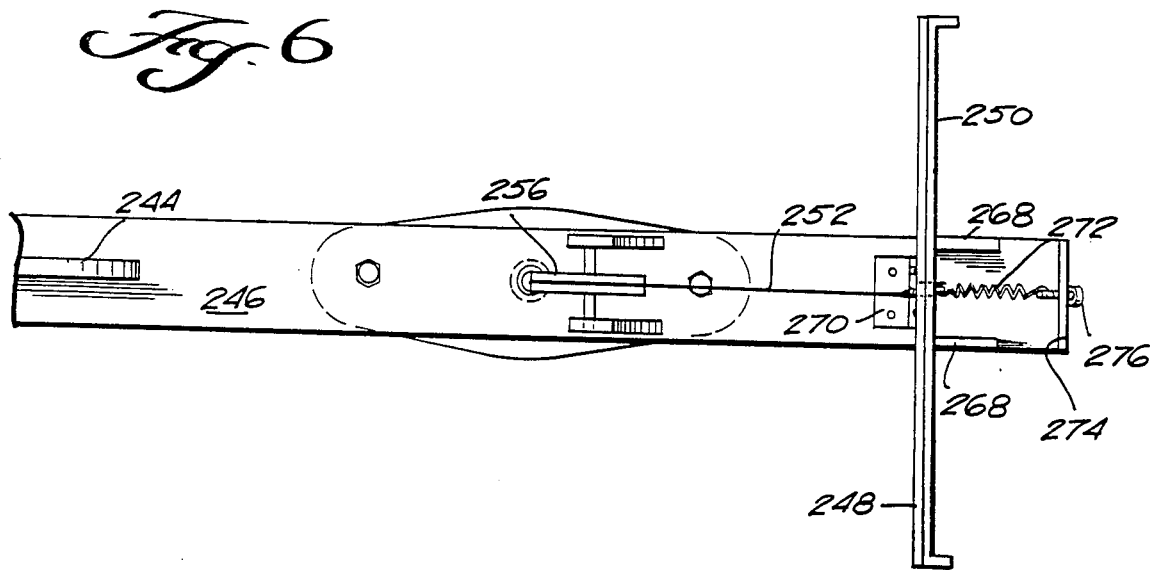
FIG. 6 is a plan view of the FIG. 5 wind sensor.
Figure 5:
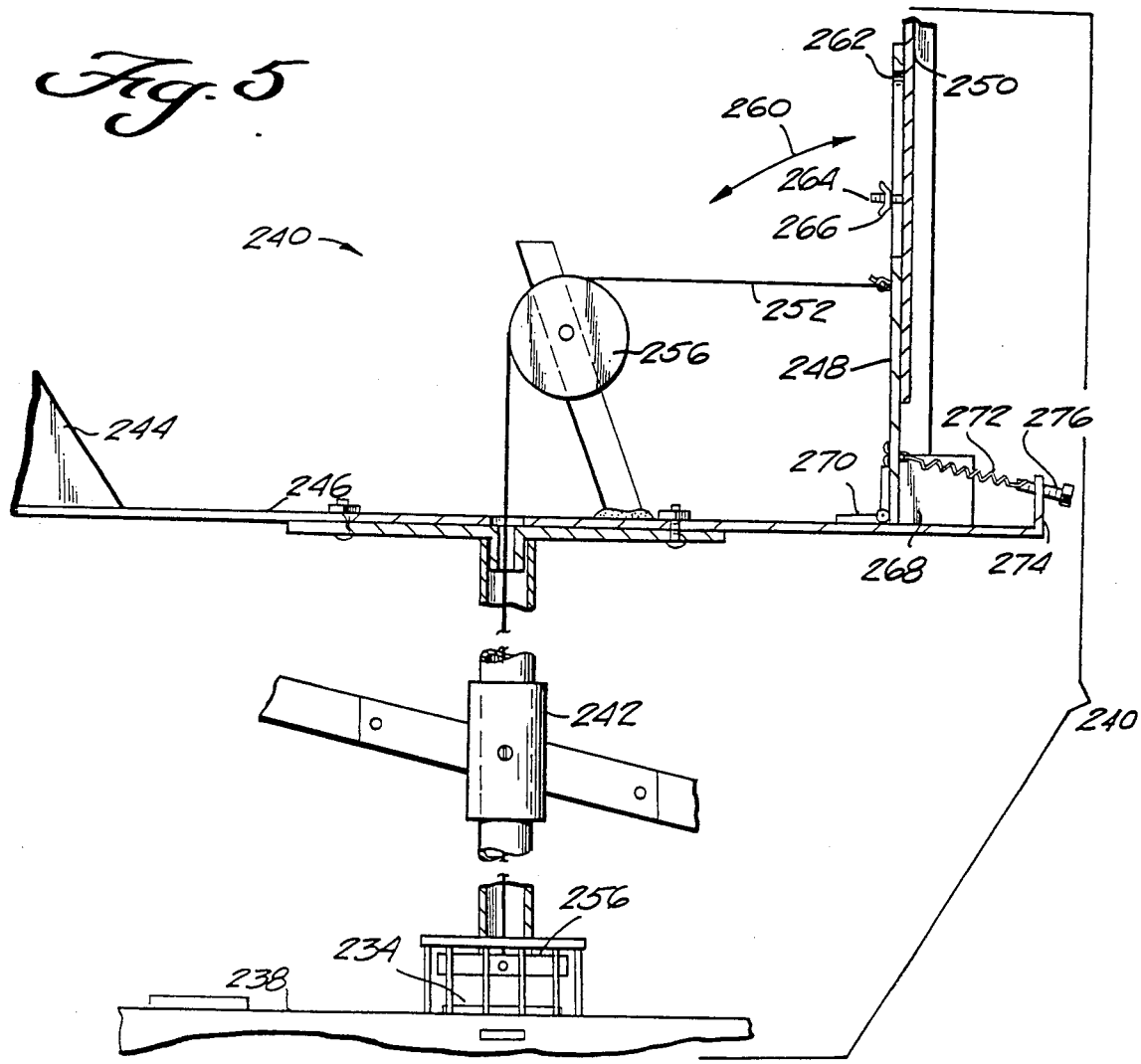
FIG. 5 is an elevational view of a wind sensor according to the present invention for sensing wind velocity and for disabling the present invention in the event a predetermined velocity is exceeded.

Another preferred exemplary embodiment according to the present invention can be seen by referring to accompanying FIGS. 4-6. The device 200 is similar to device 10 described above in that a frame 202 is provided to support the propane gun 204 and the operative scarecrow FIG. 206. As can be appreciated, scarecrow 206 can be styled in any desired manner as, for example, a humanoid cowboy depicted in accompanying FIG. 4. The arms 208, 210 can be, for example, flexible plastic tubing so as to yield in response to the wind and also in response to the vertical reciprocal movement of scarecrow portion 206 when propane gun 204 is operated. Plural flexible streamers 211 of e.g. foil, plastic sheets or the like can also be provided to enhance the visual scaring effect upon birds. The device 200 preferably includes suitable mechanisms (not shown) to permit swivel movement of the torso portion 213 to further enhance the visual scaring effect upon birds.

The actuator mechanism according to the embodiment depicted in FIG. 4 generally comprises a rod 212 having an enlarged plunger portion 214 at the distal end thereof and being connected to actuator plate 216 at the proximal end thereof. Thus, when the gun 204 is operated, the combustion gases will bear against plunger portion 214 and thus enhance the forward displacement of actuator 216 (arrow 218 in FIG. 4). Thus, upon movement upon actuator plate 216 in the direction indicated by arrow 218 in FIG. 4, flexible cable 220 will pivot arm 222 and, due to the pulley system as previously described with regard to the FIG. 1 embodiment, the scarecrow portion 206 will be upwardly displaced to its active position (e.g. in the direction of arrow 224 in FIG. 4). Actuator plate 216 preferably includes members 226 which are slidably received within guide tubes 228 (only one pair of member 226 and guide tube 228 are evident in FIG. 4) so as to stabilize actuator plate 216 when it is displaced from its active position (as shown in solid line in FIG. 4) to it active position (e.g. when displaced in the direction of arrow 218). Pivot arm 222 is provided with a counter balancing weighted member 229 which is adjustable along the axial length of arm 222 so as to aid in the movement of torso portion 213 between its active and inactive positions and to compensate for the weight of the torso portion 213. Adjustable movement of weighted member 229 is achieved through the use of standard connecting U-bolts 230. Additionally, a recoil spring 231 operatively interconnects cable 220 and actuator plate 216 so as to aid the return of the rod 212 to its inactive position (e.g. as shown in FIG. 4).

A pair of wheels 232 can be provided on frame 202 so as to provide relative mobility to the device 200 and to permit the user to choose the desired location thereof.

Since birds typically roost at night, it is only necessary for the device of the present invention to operate only during the daylight hours so as to conserve the combustible fuel (e.g. preferably propane gas) contained in fuel container 233. According to the present invention, therefore, a photocell 234 is provided to sense the daylight hours. A solenoid valve 236 responsive to the photocell is provided so as to interrupt the flow of gas to gun 204 when the photocell 234 senses darkness thereby disabling the firing of gun 204 and, accordingly, disabling the vertical displacement of scarecrow portion 206. The solenoid valve 236 is connected to a drive transistor which operates in dependence with the photocell according to known techniques. The valve and the transistor will, of course, be powered by a battery (not shown) which is preferably housed within container 238.

Since the device 200 could be damaged by high winds, means are provided according to the present invention which disable the firing of gun 204 and thus, disable the vertical displacement of scarecrow portion 206 so as to minimize any damage which could occur due to such high wind velocities. According to the present invention, a wind sensor 240 is provided and is pivotally attached to frame 202 via sleeve 242 so that the wind sensor 240 can rotate (arrow 241) in response to the prevailing wind direction and, therefore, will always be facing into the prevailing wind. This pivotal movement is accomplished by providing a vane 244 on the frame 246 opposite to the wind sensing panels 248, 250. A flexible cable 252 is attached to sensing panel 248 and is directed into tube 254 by virtue of journalled pulley 256. The distal end of tube 254 is provided so as to be in close proximity to photocell 234 and, accordingly, at the distal end of cable 252, a covering plate 256 is attached. When sensing plates 248, 250 are rearwardly displaced (see arrow 260 in FIG. 5) the cover member 256 will register with photocell 234 thereby covering the latter and giving photocell 234 a false impression that nighttime is present to disable gun 204 by shutting off the fuel supply thereto as previously described.

The wind sensor can be set for any predetermined wind velocity by adjusting the overall surface area of plates 248, 250 which is exposed to the wind. Such adjustment is accomplished by providing relative vertical movement of plate 250 with respect to plate 248 by means of a elongated slot 262 defined in plate 248. Accordingly, a threaded bolt 264 rigidly fixed to plate 250 and slidably cooperating with slot 262 will permit relative vertical displacement between plates 248 and 250. Thus, by virtue of bolt 264 and nut 266, the desired overall surface area exposed to the oncoming prevailing wind can be selected. A stop member 268 is provided in advance of plate 248 so as to limit the extreme forward advance thereof while plate 248 is fixed to frame 246 by hinge 270 so as to permit relative hinged movement (arrow 260) of plates 248, 250.

In addition to the above-described adjustment means which can be provided with sensor 240 so as to adjust same for sensing a predetermined wind velocity and thus provide a threshold wind velocity for actuation, a biasing spring 272 can be connected between plate 248 and flange 274 by means of an adjustment bolt 276. Adjustment bolt 276 threadably cooperates with flange 274 so as to permit an adjustable range of biasing force exerted upon plates 248, 250 by spring 272. Spring 272 biases plates 248, 250 in a direction towards their extreme upright position (e.g. the extreme limit defined by stop member 268). Thus, since vane 244 will direct plates 248, 250 into the oncoming prevailing wind, the amount of tension provided by spring 272 will also help determine, in a preselected manner, the threshold velocity which is sufficient to overcome the biasing force of spring 272 and thus permit plates 248, 250 to be rearwardly hingedly moved (arrow 260) so as to disable the device of the present invention as previously described.

Accordingly, in addition to the surface area of plates 248, 250 which can be adjustably selected, the biasing force established by spring 272 will also contribute to the range of adjustment provided by sensor 240 so that virtually all desired wind velocities which could cause damage to the device of the present invention can be sensed and thus, the device can be disabled to prevent such damage.

Another embodiment of the bird scaring device (generally noted as 300 in FIGS. 7 and 8) generally comprises a cap member 302 which is adapted to fit onto the open end of barrel extension 304 which fits over the barrel proper 305 of gun 306. Extension 304 is preferably a cylinder constructed of rigid PVC material or the like. Gun 306 is preferably propane or LP gas actuated from a source thereof (not shown). A particularly preferred form of gun 306 can be obtained from B. M. Lawrence & Co., 351 California Street, San Francisco, Calif. 94104 and is marketed under the tradename "ZON".

Barrel extension 304 is preferably substantially vertically disposed and to this end a vertical support pipe 308 fixed to horizontal, ground-engaging stand members 310 are provided. Gun 306 can therefore be fixed to pipe 308 via mounting collars 312, 314.

Cap member 302 can be more clearly seen by referring to FIG. 8. As shown, cap member 302 includes a male portion 316 which closely fits within bore 318 of barrel extension 304. Guide pipe 320 is substantially coaxially disposed relative bore 318 and slideably houses control rod 322 to permit sliding movement thereof (arrow 324) between rest and operative positions. A weather gasket 326 of a suitable flexible sealing material (w.g. rubber or the like) is provided so as to safeguard the internal mechanisms of gun 306 from environmental conditions.

The lower end of control rod 322 includes a piston 328 of increased cross-sectional diameter to enhance the movement of rod 322 in response to combustion gases being emitted from barrel 305 at increased velocity. Thus, upon ignition of the combustible fuel (e.g. propane gas), the torso portion 330 will be moved to an active position by virtue of rod 322 being upwardly displaced in extension 304. Torso portion 330 includes arm members 332, 334 and a head member 336 so as to permit the user to decorate same in any desired humanoid manner.

To compensate for the weight of torso 330 (as decorated by the user) a weighted member 340 is operatively connected to control rod 322 by means of flexible cable 342 guided around journalled pulley 344. Thus, the weight of weighted member 340 can be selected so as to somewhat counter balance the inertial force exerted upon piston 328 and thus permit ease of movement of rod 322 in extension 304. Of course, the weight of member 340 should not exceed the combined weight of torso portion 330 otherwise return of torso portion 330 to its inactive position (as shown in FIG. 7) would be prohibited.

Thus, when consideration is given the preferred embodiments of the present invention, one will appreciate that it represents a distinct advance in the art of scaring birds. It is presently contemplated that once a device in accordance with this invention is placed in a field of growing crops, substantially maintenance-free, self-sustaining operation will result. Of course, periodic replenishment of the combustible gas will be necessary, but this chore is minimal when compared to the potential for significantly increased crop yields that the present invention could aid in realizing.

While an air gun of the type emitting a gaseous stream has disclosed herein, it should be appreciated that such disclosure represents a particularly preferred embodiment according to the present invention and, therefore, non-limiting thereto. As such, other state of the art actuators such as, electrical, pneumatic, or electro-mechanical actuators are conceivable.

Thus, while the present invention has been herein described in what is presently conceived to be the most preferred embodiments thereof, it will be understood to those in the art that many modifications may be made hereof within the scope of the present invention, which scope is to be accorded the broadest interpretation of the appended claims so as to encompass all equivalent structures, devices, or assemblies.

What is claimed is:

1. A bird scaring device comprising:
   a frame;
   visual means having active and inactive positions attached to said frame for scaring birds;
   actuator means operatively connected to said visual means for moving said visual means between said inactive and said active positions; and
   control means operatively connected to said actuator means for disabling said actuator means and thus said visual means in dependence upon predetermined ambient conditions, wherein said control means includes (a) light detector means for sensing daylight and night hours and for disabling said actuator means during said night hours, and (b) wind sensor means operatively connected to said actuator means for sensing wind velocity and for disabling said actuator in dependence upon sensing a wind velocity greater than a preestablished wind velocity, said wind sensor means including;
   (a) means defining a predetermined surface area and being hingedly moveable between first and second positions;
   (b) vane means for directing said surface area defining means into a wind velocity sensing position; and
   (c) cover means operatively connected to said surface area defining means and displaceable therewith in response to movement thereof between said first and second positions wherein said cover means is in a covering relationship with respect to said light detector means when said surface defining means is in said second position to prevent light from being sensed by said light detector means thereby disabling said actuator means and wherein said cover means in an uncovering relationship with respect to said light detector means when said surface defining means is in said first position to permit light to be sensed by said light detector means thereby permitting operation of said actuator means.

2. A bird scaring device as in claim 1 wherein said surface area defining means includes means for selecting a predetermined surface area.

3. A bird scaring device as in claim 1 wherein said actuator means includes:
   gas ejector means defining a cavity for ejecting a gaseous stream in a predetermined path and at increased velocity; and
   velocity responsive means operatively connecting said gas ejector means and said visual means for absorbing the energy developed by said gaseous stream and for being moved in response thereto between rest and operable position to responsively move said visual means between said inactive position and said active position, respectively.

4. A bird scaring device as in claim 3 wherein said actuator means includes:

an elongated rod member disposed in said cavity and having means defining an enlarged portion; and means connecting said rod member to said frame for sliding reciprocal movement with respect thereto.

5. A bird scaring device comprising:
a frame;
visual means having active and inactive positions attached to said frame for scaring birds;
actuator means for ejecting a gaseous stream in a predetermined path at increased velocity;
target means defining a surface disposed in said predetermined path and journalled to said frame so as to pivotally move between rest and operable positions in response to said gaseous stream impinging upon said surface;
a lever member rigidly fixed to said target means and pivotal therewith between said rest and operable positions; and
means operatively connecting said lever member and said visual means for moving said visual means between said inactive and active positions in response to said target means pivotally moving between said rest and operable positions, respectively.

6. A device for scaring birds thereby aiding in the prevention of crop destruction comprising in combination:
means for ejecting a gaseous stream in a predetermined path at increased velocity and at predetermined time intervals;
target means defining a surface disposed in said predetermined path and pivotally moveable between rest and operable positions in response to said gaseous stream impinging upon said surface of said target means;
a lever member rigidly fixed to said target means and pivotal therewith between said rest and operable positions;
visual means reciprocally displaceable between inactive and active positions for scaring birds; and
pulley system means operatively connecting said lever member and said visual means for displacing said visual means between said inactive and active positions in response to said target means being pivotally moved between said rest and operable positions, respectively.

7. A device as in claim 5 or 6 further comprising means for retaining said visual means in said active position for a predetermined period of time and for gradually returning said visual means to said inactive position.

8. A device as in claim 6 wherein said visual means is vertically disposed and includes:
means defining an elongated cylindrical cavity;
piston means disposed in said cylindrical cavity for reciprocal movement therein and, wherein said pulley system means connects said piston means and said lever member so that said piston means is raised to said active position in said cavity in response to said target means being pivotally moved to said operable position by virtue of said gaseous stream impinging upon said surface of said target means.

9. A device as in claim 8 wherein said pulley system means includes:
a first pulley journalled to said piston means;
a second pulley journalled to said cavity defining means; and cable means having a first end attached to said lever member and a second end fixedly attached to a predetermined portion of said cavity defining means, said cable means intermediate said first and second ends being operatively threaded around a portion of each of said first and second pulleys.

10. A device as in claim 8 further comprising means for retaining said visual means in said active position for a predetermined period of time and for gradually returning said visual means to said inactive position.

11. A device as in claim 10 wherein said piston means includes:
an elongated rod axially disposed in said cavity having upper and lower opposing ends;
plunger means attached to said lower end for contacting the interior surface of said cavity defining means so as to provide an occlusive seal therewith; and
cap means attached to said upper end covering said cavity defining means when said piston means is in said inactive position.

12. A device as in claim 10 or 11 wherein said retaining and returning means comprises:
inlet valve means for permitting one-way access for ambient air to be drawn into said cavity as said visual means moves between said inactive and active positions; and
exit valve means for permitting one-way egress of said ambient air drawn into said cavity at a predetermined flow rate so that when said visual means achieves said active position, said ambient air drawn into said cavity during movement of said piston means from said inactive position to said active position provides an air cushion to retain said visual means in said active position for a predetermined time interval and thereafter the weight of said visual means will forceably cause said ambient air in said cavity to exit through said exit valve means at a predetermined rate so as to gradually return said visual means to said inactive position.

13. A device as in claim 12 further comprising enclosure means rigidly connected to said frame for housing said cavity defining means and defining an interior space between said enclosure means and said cavity defining means.

14. A device as in claim 13 where said visual means includes flexible strip means housed in said interior space when said visual means is in said inactive position for providing randomly moving streamers when said visual means moves to said active position so as to aid in the scaring of birds.

15. A device as in claim 6 further comprising means for securely anchoring said frame to the ground.

16. A bird scaring device comprising:
a frame including a pair of upright frame supports and target means disposed along a predetermined path and journalled so as to pivotally move between rest and operable positions;
visual means for scaring birds having inactive and active positions and attached to said frame so as to be vertically disposed, said visual means including means defining an elongated cylindrical cavity, piston means disposed in said cylindrical cavity for reciprocal movement therein, and connecting means for connecting said piston means and said target means so that said piston means is raised to said active position in said cavity in response to said target means being moved to said operable position, said connecting means including a lever member journalled between said pair of upright frame supports, and pulley system means operatively connecting said piston means and said lever member; and actuator means for ejecting a gaseous stream in said predetermined path and at increased velocity for moving said visual means between said inactive and active positions in response to said target means moving between said rest and operable positions by virtue of said gaseous stream impinging upon said target means.

17. A device for scaring birds thereby aiding in the prevention of crop destruction comprising in combination:

means for ejecting a gaseous stream in a predetermined path at increased velocity and at predetermined time intervals;

a frame including a pair of upright frame supports and target means disposed in said predetermined path for moving between rest and operable positions in response to said gaseous stream impinging upon a surface of said target means; and vertically disposed visual means for scaring birds, said visual means being reciprocally operable between inactive and active positions in response to said target means being moved between said rest and operable positions, respectively, said visual means including means defining an elongated cylindrical cavity and piston means disposed in said cylindrical cavity for reciprocal movement therein; and means connecting said piston means and said target means so that said piston means is raised to said active position in said cavity in response to said target means being moved to said operable position by virtue of said gaseous stream impinging upon said surface of said target means, and wherein said connecting means includes a lever member journalled between said pair of upright frame supports and pulley system means operatively connecting said piston means and said lever member.

* * * * *